United States Patent
Omote et al.

(10) Patent No.: US 11,885,753 B2
(45) Date of Patent: Jan. 30, 2024

(54) IMAGING TYPE X-RAY MICROSCOPE

(71) Applicant: Rigaku Corporation, Tokyo (JP)

(72) Inventors: Kazuhiko Omote, Tokyo (JP); Raita Hirose, Tokyo (JP); Shuichi Kato, Tokyo (JP); Yuriy Platonov, Auburn Hills, MI (US)

(73) Assignee: Rigaku Corporation, Tokyo (JP)

(*) Notice: Subject to any disclaimer, the term of this patent is extended or adjusted under 35 U.S.C. 154(b) by 0 days.

(21) Appl. No.: 17/501,378

(22) Filed: Oct. 14, 2021

(65) Prior Publication Data

US 2022/0128487 A1  Apr. 28, 2022

(30) Foreign Application Priority Data

Oct. 23, 2020  (JP) .................... 2020-178363

(51) Int. Cl.
*G01N 23/04* (2018.01)

(52) U.S. Cl.
CPC ......... *G01N 23/04* (2013.01); *G01N 2223/30* (2013.01)

(58) Field of Classification Search
CPC .. G01N 23/04; G01N 2223/30; G01N 23/046; G01N 2223/03; G01N 2223/1016; G21K 1/062; G21K 7/00
See application file for complete search history.

(56) References Cited

U.S. PATENT DOCUMENTS

| | | | | |
|---|---|---|---|---|
| 4,870,674 A * | 9/1989 | Schmahl | ................ | G21K 7/00 976/DIG. 445 |
| 5,450,463 A * | 9/1995 | Iketaki | ................ | G21K 7/00 378/43 |
| 5,550,887 A * | 8/1996 | Schmal | ................ | G21K 7/00 378/43 |

(Continued)

FOREIGN PATENT DOCUMENTS

| JP | H03-140900 A | 6/1991 |
|---|---|---|
| JP | H06-250000 A | 9/1994 |

(Continued)

OTHER PUBLICATIONS

Lider, V.V. Kirkpatrick-Baez and Wolter X-Ray Focusing Optics (Review). J. Surf. Investig. 13, 670-682 (2019) (Year: 2019).*

(Continued)

*Primary Examiner* — David P Porta
*Assistant Examiner* — Djura Malevic
(74) *Attorney, Agent, or Firm* — ASLAN LAW, P.C.

(57) ABSTRACT

An imaging type X-ray microscope capable of enlarging a numerical aperture even with high energy X-rays and acquiring a magnified image with sufficient intensity even in a laboratory. The imaging type X-ray microscope comprises an X-ray irradiation unit having a microfocal and high-power X-ray source and a condenser mirror for focusing and irradiating the emitted X-rays toward a sample, a sample holding unit for holding the sample, a reflecting mirror type X-ray lens unit for imaging X-rays transmitted through the (Continued)

sample, and an imaging unit for acquiring the imaged X-ray image, wherein each mirror constituting the condenser mirror and the reflecting mirror type X-ray lens unit has a reflecting surface formed with a multilayer film having a high reflectivity in X-rays of a specific wavelength.

5 Claims, 15 Drawing Sheets

(56) References Cited

U.S. PATENT DOCUMENTS

| | | | | |
|---|---|---|---|---|
| 5,590,168 | A * | 12/1996 | Iketaki | G21K 7/00 378/43 |
| 6,014,423 | A * | 1/2000 | Gutman | B82Y 10/00 378/85 |
| 6,041,099 | A * | 3/2000 | Gutman | G21K 1/06 378/85 |
| 6,167,112 | A * | 12/2000 | Schneider | G21K 7/00 378/43 |
| 6,359,963 | B1 * | 3/2002 | Cash | G21K 1/06 378/65 |
| 6,389,101 | B1 * | 5/2002 | Levine | G01N 23/046 378/85 |
| 6,478,433 | B2 * | 11/2002 | Shirasaki | G02B 6/29392 359/578 |
| 6,529,578 | B1 * | 3/2003 | Taguchi | G21K 1/06 378/43 |
| 7,119,953 | B2 * | 10/2006 | Yun | G21K 7/00 359/368 |
| 7,394,890 | B1 * | 7/2008 | Wang | G21K 7/00 378/43 |
| 7,406,151 | B1 * | 7/2008 | Yun | G21K 7/00 378/43 |
| 7,920,676 | B2 * | 4/2011 | Yun | G01N 23/201 378/70 |
| 8,115,806 | B2 * | 2/2012 | Osawa | G02B 21/06 348/63 |
| 8,792,162 | B2 * | 7/2014 | Lippert | G02B 21/0076 359/388 |
| 8,836,948 | B2 * | 9/2014 | Liu | G01B 11/2441 356/450 |
| 9,307,169 | B2 * | 4/2016 | Kodama | G01J 3/0208 |
| 9,645,378 | B2 * | 5/2017 | Hilbert | G02B 21/16 |
| 9,823,203 | B2 * | 11/2017 | Yun | G01N 23/205 |
| 9,943,272 | B2 * | 4/2018 | Wang | G01N 23/20008 |
| 10,269,528 | B2 * | 4/2019 | Yun | H01J 35/10 |
| 10,297,359 | B2 * | 5/2019 | Yun | H01J 35/10 |
| 10,649,196 | B2 * | 5/2020 | Osawa | G02B 27/58 |
| 10,854,348 | B2 * | 12/2020 | Omote | G21K 1/025 |
| 10,962,491 | B2 * | 3/2021 | Yun | G21K 1/02 |
| 11,189,392 | B2 * | 11/2021 | Matsuyama | G21K 1/067 |
| 11,215,572 | B2 * | 1/2022 | Yun | G01N 23/223 |
| 11,217,357 | B2 * | 1/2022 | Yun | G01N 23/205 |
| 11,549,895 | B2 * | 1/2023 | Yun | G01N 23/20 |
| 11,573,392 | B2 * | 2/2023 | Yamane | G02B 7/04 |
| 2003/0081318 | A1 * | 5/2003 | Shirasaki | G02B 6/29394 359/615 |
| 2004/0165270 | A1 * | 8/2004 | Shirasaki | G02B 27/144 359/634 |
| 2005/0174653 | A1 * | 8/2005 | Shirasaki | G02B 6/29392 359/489.19 |
| 2008/0084967 | A1 * | 4/2008 | Matsuo | G21K 1/06 378/149 |
| 2011/0085644 | A1 * | 4/2011 | Verman | G21K 1/06 378/147 |
| 2012/0026311 | A1 * | 2/2012 | Ouchi | G02B 21/0076 359/386 |
| 2013/0228705 | A1 * | 9/2013 | Nishikawa | G01N 21/6428 250/459.1 |
| 2013/0229665 | A1 * | 9/2013 | Nomura | G02B 21/16 356/601 |
| 2013/0329858 | A1 * | 12/2013 | Jiang | G01N 23/201 378/87 |
| 2014/0104407 | A1 * | 4/2014 | Ouchi | G02B 21/0092 359/371 |
| 2015/0168702 | A1 * | 6/2015 | Harris | G02B 21/367 250/306 |
| 2015/0168706 | A1 * | 6/2015 | Schweinitzer | G02B 21/367 348/80 |
| 2015/0177506 | A1 * | 6/2015 | Nishiwaki | G02B 21/367 348/46 |
| 2015/0185463 | A1 * | 7/2015 | Ohki | G02B 27/58 348/79 |
| 2016/0070091 | A1 * | 3/2016 | Hufnagel | G02B 21/33 359/385 |
| 2016/0124201 | A1 * | 5/2016 | Kikuchi | G02B 21/0048 359/385 |
| 2016/0124203 | A1 * | 5/2016 | Ryu | G02B 21/06 359/385 |
| 2016/0131885 | A1 * | 5/2016 | Nakayama | G01N 21/6458 359/370 |
| 2016/0305883 | A1 * | 10/2016 | Betzig | G02B 21/16 |
| 2016/0306154 | A1 * | 10/2016 | Iguchi | G02B 21/16 |
| 2016/0320600 | A1 * | 11/2016 | Dake | G02F 1/13768 |
| 2016/0334613 | A1 * | 11/2016 | Ishiwata | G02B 21/367 |
| 2017/0139193 | A1 * | 5/2017 | Iguchi | G02B 15/00 |
| 2017/0336334 | A1 * | 11/2017 | Yun | G01N 23/276 |
| 2018/0261352 | A1 * | 9/2018 | Matsuyama | G21K 7/00 |
| 2019/0272929 | A1 * | 9/2019 | Omote | G01N 23/201 |
| 2019/0311874 | A1 * | 10/2019 | Tuohimaa | H01J 35/08 |
| 2019/0353802 | A1 * | 11/2019 | Steinhauser | H01L 27/14621 |
| 2020/0003708 | A1 * | 1/2020 | Kobayashi | G01N 23/2055 |
| 2020/0105492 | A1 * | 4/2020 | Behling | H01J 35/105 |
| 2021/0231905 | A1 * | 7/2021 | Yamane | H01L 31/115 |
| 2022/0128487 | A1 * | 4/2022 | Omote | G21K 7/00 |

FOREIGN PATENT DOCUMENTS

| | | |
|---|---|---|
| JP | 2004-347463 A | 12/2004 |
| JP | 2017-072441 A | 4/2017 |
| JP | 6478433 B2 | 3/2019 |

OTHER PUBLICATIONS

EP Search Report issued in EP Application No. 21 203 333.6, European Patent Office, Munich Germany, dated Mar. 25, 2022, 8 pages.

Kiyoshi Daimon, Japanese Office Action issued in JP Application No. 2020-178363, JPO, Japan, dated Jul. 25, 2023, 5 pages.

JP Office Action issued in JP Application No. 2020-178363, JPO, Japan, dated Oct. 24, 2023, 2 pages.

Shuhei Yasuda et al., "Development of a full-field X-ray microscope with two monolithic one-dimensional Wolter mirrors", Proceedings of Lecture Papers from the 2015 Annual.

Precision Engineering Society Fall Conference Academic Lectures, L33, Japan, 2015, p. 705-706.

\* cited by examiner

IMAGING TYPE X-RAY MICROSCOPE

CROSS-REFERENCE TO RELATED APPLICATIONS

This application claims priority to JP Patent Application No. 2020-178363 filed on Oct. 23, 2020, the entire contents of which are hereby incorporated by reference.

RELATED ART

Field of the Invention

The present invention relates to a technique for greatly improving the performance of an imaging type X-ray microscope in a laboratory.

Description of the Related Art

In a conventional imaging type X-ray microscope, a Fresnel zone plate lens (FZP) is often used for an imaging system (for example, see Patent Document 1). However, when FZP is applied to high-energy X-rays, it is difficult to increase the aspect ratio, the diffraction efficiency is significantly reduced. For example, when X-rays of 15 keV or more are imaged by FZP, the efficiency becomes several percent or less. Also, the numerical aperture (NA) is 1 mrad or less, which is very low. Therefore, it has been difficult to realize a high-resolution X-ray microscope using high-energy X-rays in a laboratory.

In contrast, an X-ray microscope using a Kirkpatrick-Baez mirror (KB mirror) with a size enable to be carried into a room has been developed (e.g., see Patent Document 2). In the X-ray microscope described in Patent Document 2, an imaging system is configured using a KB mirror having a reflection concave surface and a KB mirror having a reflection convex surface. As a result, the rear focal length of the optical system is shortened while the magnification being maintained.

PATENT DOCUMENTS

Patent Document 1: U.S. Pat. No. 7,394,890
Patent Document 2: Japanese Patent No. 6478433

However, in the X-ray microscope described in Patent Document 2, the angle of incidence must be limited below the critical angle since the total reflection of X-rays is utilized, and thus it is necessary to increase the size of the X-ray beam direction in order to realize a lens with large numerical aperture. Especially, X-ray microscope which can image with high efficiency even in the X-ray of high energy in the size which can be installed in the laboratory is required.

SUMMARY OF THE INVENTION

The present invention has been made in view of the above circumstances, and an object thereof is to provide an imaging type X-ray microscope capable of enlarging the numerical aperture even with high energy X-rays, and capable of acquiring an enlarged image with sufficient intensity even in a laboratory.

(1) In order to achieve the above described object, the imaging type X-ray microscope comprising: an X-ray irradiation unit having a microfocal and high-power X-ray source and a condenser mirror for focusing and irradiating the emitted X-rays toward a sample, a sample holding unit for holding the sample, a reflecting mirror type X-ray lens unit for imaging X-rays transmitted through the sample, an imaging unit for acquiring the imaged X-ray image, wherein each mirror constituting the condenser mirror and the reflecting mirror type X-ray lens unit has a reflecting surface formed with a multilayer film having a high reflectivity in X-rays of a specific wavelength.

Thus since each mirror constituting the condenser and the imaging lens has a reflecting surface formed by a multilayer film, even high energy X-rays, it is possible to increase the numerical aperture by maintaining a high X-ray incident angle, even in the laboratory it is possible to acquire an enlarged image of sufficient intensity.

(2) Further, in the imaging type X-ray microscope of the present invention, the X-ray source generates X-rays with a focal spot size of 100 μm or less, the condenser mirror focuses the generated X-rays in an irradiation region of 100 μm or less. Thus, it can be focused at a micro focus, it is possible to increase the X-ray luminance entering the target field of view. If the focal size of the X-ray source and the focal size in the irradiation region can be narrowed down to 50 μm or less, it is possible to acquire a brighter enlarged image.

(3) Further, in the imaging type X-ray microscope of the present invention, the reflecting mirror type X-ray lens unit is a Wolter type mirror set capable of reflecting in a first direction perpendicular to the X-ray irradiation direction and a second direction perpendicular to the first direction. Thus, even for X-rays of high energy, it is possible to acquire an X-ray enlarged image of high efficiency and high resolution.

(4) Further, in the imaging type X-ray microscope of the present invention, the irradiated X-rays have an output of 500 W or more. As a result, the luminance of the irradiated X-rays can be increased. Further, the output of the X-ray source, if 1 kW or more, it is possible to acquire a brighter image.

(5) Further, in the imaging type X-ray microscope of the present invention, the irradiated X-rays have an energy of 4 keV or more. By using such high energy X-rays, high X-ray transmittance, it is possible to acquire a high-resolution image of the internal structure of the sample non-destructively.

(6) Further, in the imaging type X-ray microscope of the present invention, the multilayer film is formed with an error of 0.5 Å or less with respect to a designed periodicity. Thus, over the entire lens surface, it is possible to reduce the disturbance in the wavefront of the X-ray. In addition, if the multilayer film is formed with the error of 0.2 Å or less, the disturbance of the wavefront can be made negligibly small, and the image formation at the high resolution becomes possible.

(7) Further, in the imaging type X-ray microscope of the present invention, the imaging unit has a spatial resolution of 1 μm or less. Thus, by combining with the X-ray imaging lens, it is possible to acquire data of the enlarged image with a high resolution of 0.1 μm or less.

According to the present invention, there is provided an imaging type X-ray microscope capable of constructing an optical system having a large numerical aperture for an image of a sample irradiated with high luminance X-rays even with high energy X-rays, and capable of acquiring a magnified image of sufficient intensity even in a laboratory.

DETAILED DESCRIPTION OF THE INVENTION

Figure 1:
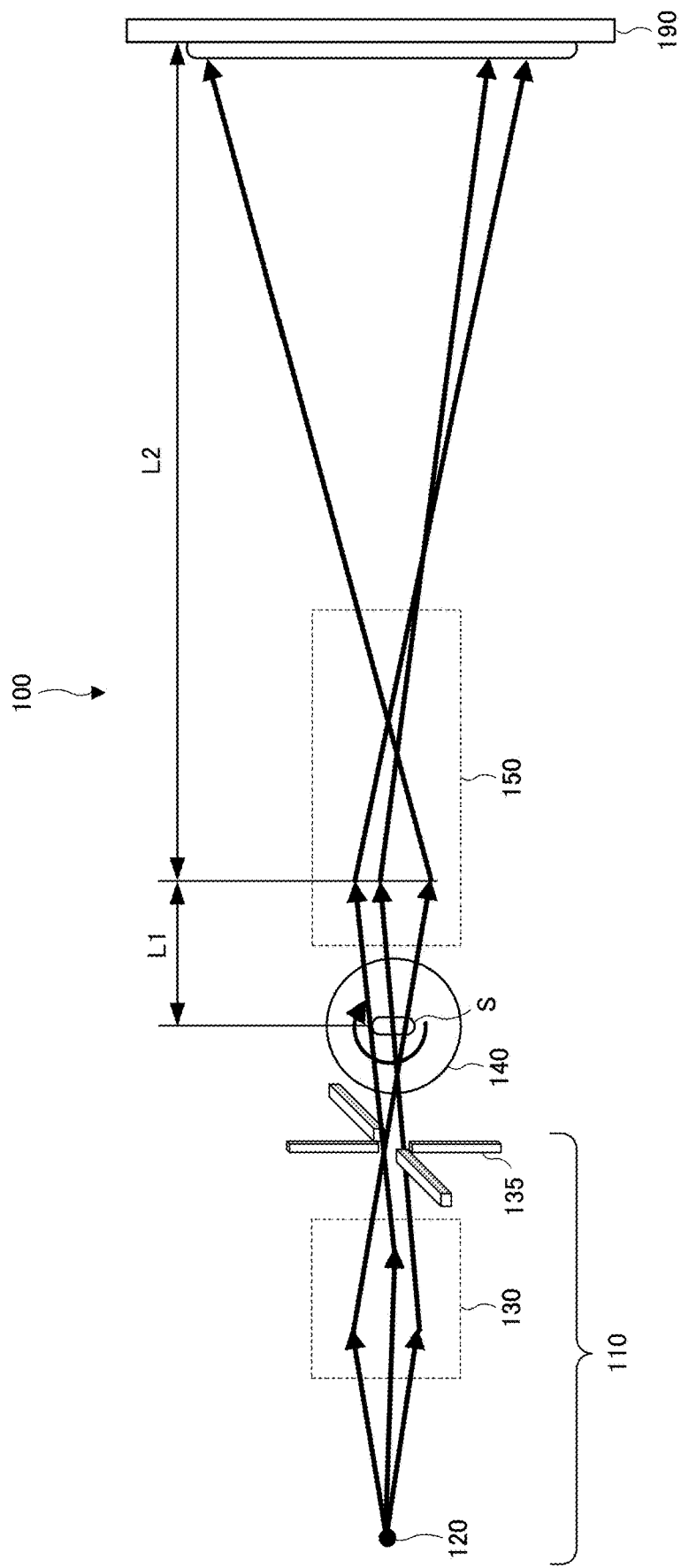
FIG. 1 is a schematic view showing an imaging type X-ray microscope of the present invention.

Next, embodiments of the present invention are described with reference to the drawings. To facilitate understanding of the description, the same reference numerals are assigned to the same components in the respective drawings, and duplicate descriptions are omitted.

[Imaging Type X-Ray Microscope]

FIG. 1 is a schematic view of an imaging type X-ray microscope 100. Imaging type X-ray microscope 100, a high-brightness X-ray source 120, a condenser mirror 130, the sample holding unit 140, a reflecting mirror type X-ray lens unit 150, and a high-resolution X-ray detector 190 (imaging unit). As each of X-ray reflecting mirror used in the condenser mirror 130 and the reflecting mirror type X-ray lens unit 150, a multilayer film is formed. Reflective surface formed by the multilayer film has a high reflectivity to X-rays of a specific wavelength, and it is possible to increase the numerical aperture by maintaining a high X-ray incident angle, it is possible to acquire a high-resolution X-ray enlarged image in a short time. The resolution δ of the imaging type X-ray microscope 100 can be expressed as δ=kλ/NA, using a constant k, a wavelength λ and a numerical aperture NA of X-rays to be irradiated.

Such imaging type X-ray microscope 100 is highly useful, for example, in inspection of semiconductor devices formed with structures of several tens of nm scale miniaturized and densified in a thickness of several μm. If wafer products can be observed or inspected in a non-destructive manner by the imaging type X-ray microscope 100, the productivity in device manufacturing can be greatly improved. In addition, the imaging type X-ray microscope 100 enables observation of a region having a size of 50 nm to 1 μm, for example, in the research field of life sciences. Specific examples include internal structures of organelles, cells, tissues, organs, organ systems, morphologies of model cells, disease model cells and morphologies of mutation sites of genetically modified animal. X-ray microscopy makes it possible to observe CT scan tomographic images of 50 nm to 1 μm in size, and thick cells can be observed three-dimensionally without being sliced.

The X-ray irradiation unit 110 has an X-ray source 120, a condenser mirror 130 and an aperture 135, and irradiates microfocal and high-power X-rays toward a sample. The X-ray source 120 is preferably a rotating anode type microfocal high power X-ray source. The irradiated X-rays preferably have an energy of 4 keV or more. The energy and wavelength of X-rays are inversely proportional, and the higher the energy, the shorter the wavelength. Therefore, by using such short X-rays of wavelength, it is possible to increase the limit of the principle resolution δ of the imaging type X-ray microscope 100. As a target of the X-ray source defining the wavelength of X-rays, for example, Cr, Cu, Mo, and Ag are referred.

The X-ray source 120 preferably generates X-rays with an output of 500 W or more, and more preferably 1 kW or more. As a result, the intensity of the irradiated X-rays can be increased. Condenser mirror 130 is optimally designed so as to focus the generated X-rays to a minute irradiation area at an focusing angle optimum to the numerical aperture of the X-ray lens. Further, the mirror surface, a multilayer film having a high reflectivity in X-rays of the required wavelength is formed. Details of the structure of the multilayer film are described below. Incidentally, in this specification, "having a high reflectance" means "when the intensity of the characteristic X-rays incident is referred as 100%, the intensity of the characteristic X-rays reflected per one reflection of the mirror is 70% or more".

The aperture 135 is capable of controlling the opening of the first direction and the second direction both perpendicular to the X-ray irradiation direction, and adjusts the size of each direction of the X-ray toward the sample S. In the present embodiment, the first direction represents the vertical direction and the second direction represents the horizontal direction, but this is not necessarily in any case.

The sample holding unit 140 has a rotation stage capable of rotation control with high accuracy, and holds the sample S. By imaging while rotating the sample S in the rotation stage, it is also possible to reconstruct the CT image from the acquired images.

The reflecting mirror type X-ray lens unit 150 has a Wolter type mirror set capable of reflecting into a first direction perpendicular to the X-ray irradiation direction and a second direction perpendicular to the first direction, the X-rays transmitted through the sample S are imaged to the receiving surface of the high-resolution X-ray detector 190. Thus, an enlarged image with high resolution in two dimensions can be acquired. A value obtained by dividing the distance L1 from the sample to the lens plane formed by the reflecting mirror type X-ray lens unit 150 by the distance L2 from the lens plane to the receiving surface is a magnification ratio of the X-ray image.

The "Wolter type" refers to the mirror set comprising mirrors respectively having hyperbolic and elliptical reflective surfaces. The "Wolter type" makes it possible to have a large area to be imaged. Each mirror has a reflective surface formed of a multilayer film. Details of the multilayer film are described below.

The high-resolution X-ray detector 190 is, for example, a CCD camera having a receiving surface, to acquire a formed X-ray image. The high-resolution X-ray detector 190 preferably has a spatial resolution of fpm or less, and more preferably has a spatial resolution of 0.5 µm or less. As a result, data of an enlarged image can be acquired with a high resolution having a pixel size of 50 nm or less, preferably 25 nm or less. The brightness of the optical intensity or the observed image is proportional to $NA^2$/magnification$^2$.

[Focusing System and Imaging System]

Figure 2A:
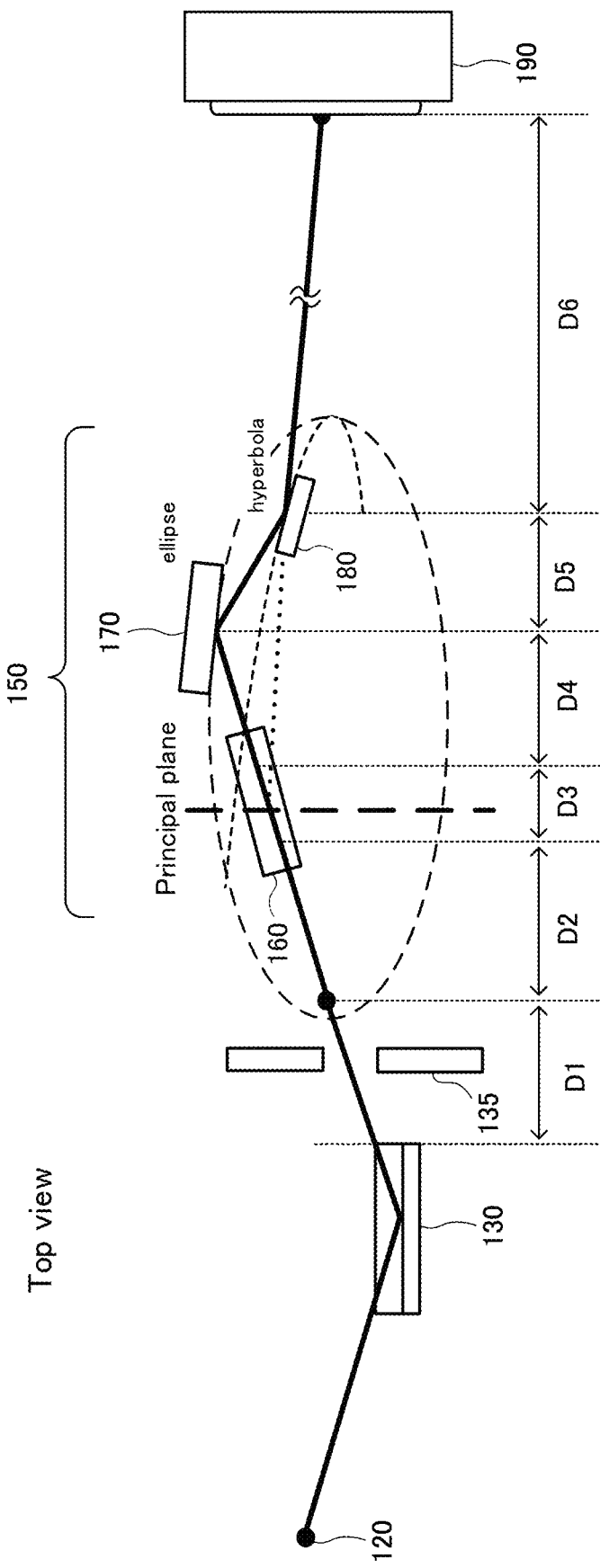
FIGS. 2A and 2B are a plan view and a front view showing an optical system of an imaging type X-ray microscope, respectively.
Figure 2B:
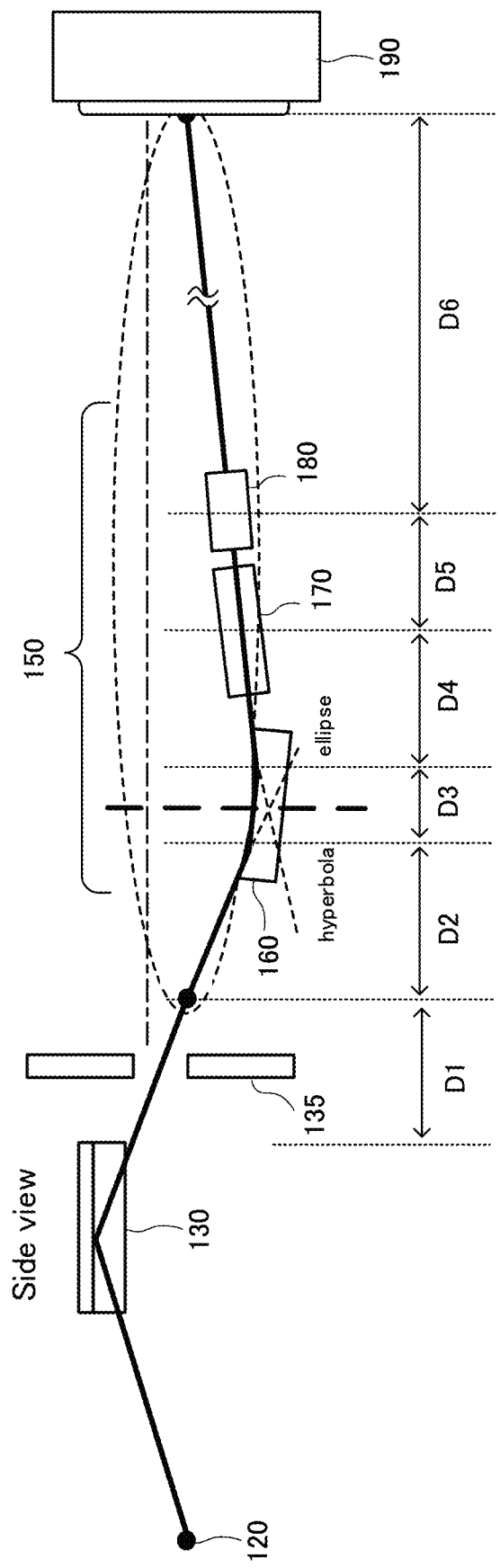

FIGS. 2A and 2B are a plan view and a front view showing an exemplary optical system of an imaging type X-ray microscope 100, respectively. As shown in FIGS. 2A and 2B, the imaging type X-ray microscope 100 includes a condenser mirror 130.

The X-ray source 120 generates X-rays with a focal spot size of 100 µm or less, and the condenser mirror 130 preferably focuses the generated X-rays on an irradiated area with a full width at half maximum (FWHM) or less. Furthermore, if the focal size of the X-ray source and the focal size at the irradiated area can be narrowed down to 50 µm (FWHM) or less, it is possible to increase the X-ray output entering the targeted viewing field. Thereby, for example, X-rays having a photon quantity $10^9$ photons per second or more can be irradiated to an irradiated area having a diameter of 50 µm. The focal spot size means the size of the effective focal spot seen from the X-ray flux side.

It is preferable that the condenser mirror 130 has vertical and horizontal reflection surfaces formed of a multilayer film, and irradiates the sample S with monochromated X-rays. It is possible to take large X-ray incident angle to the mirror by the multilayer film, it is possible to form a micro focus with large X-ray intensity by a large focusing angle.

In the example shown in FIGS. 2A and 2B, a reflecting mirror type X-ray lens unit 150 has an imaging element 160, 170 and 180 in the order from the sample S side. The imaging element 160 has a mirror set by the first imaging mirror and the second imaging mirror of the vertical reflection. The imaging element 170 has a first imaging mirror of horizontal reflection and the imaging element 180 has a second imaging mirror of horizontal reflection. The mirror set of horizontal reflection is constituted by the imaging element 170 and 180. The distance D1 between the second imaging mirror and the sample S of the horizontal reflection is described below.

Both the first imaging mirror and the second imaging mirror of the vertical reflection are concave mirrors. These mirror sets form a lens plane at a position overlapping the mirror set. On the other hand, the first imaging mirror of the horizontal reflection is a concave mirror and the second imaging mirror of the horizontal reflection is a convex mirror. These mirror sets form a lens plane at the position of the front stage of the mirror set. Then, by precisely processing the reflecting surface of each mirror, it is possible to match the lens plane of the vertical reflection with the lens plane of the horizontal reflection. In the above example, though the combination of successive 3 concave and 1 convex mirrors are adopted from the viewpoint of the compactness and matching the lens planes, another combination of mirrors arrangement may be adopted.

In the examples shown in FIGS. 2A and 2B, the distances D2, D3, D4, D5, and D6 obtained by dividing the distance on the optical axis from the sample S to the receiving surface by the reflecting positions of the respective imaging mirrors can be set to, for example, 30-40 mm, 30-40 mm, 50-70 mm, 50-70 mm, and 1-2 m. The distance D2 is called working distance, corresponds to the distance from the sample S to the first imaging mirror of the vertical reflection. A user desires to make the working distance as large as possible in arranging and measuring the sample S, but there are limitations in obtaining necessary magnification ratio and numerical aperture as described below.

In the examples shown in FIGS. 2A and 2B, multilayer films are formed as the reflecting surface in any of the imaging mirrors including the condenser mirror 130 and the imaging elements 160 to 180. As a result, even with high-energy X-rays, intense X-rays can not only be irradiated to the sample position at a large focusing angle, but also the numerical aperture can be increased, and a magnified image of sufficient intensity can be acquired even in a laboratory.

Figure 3:
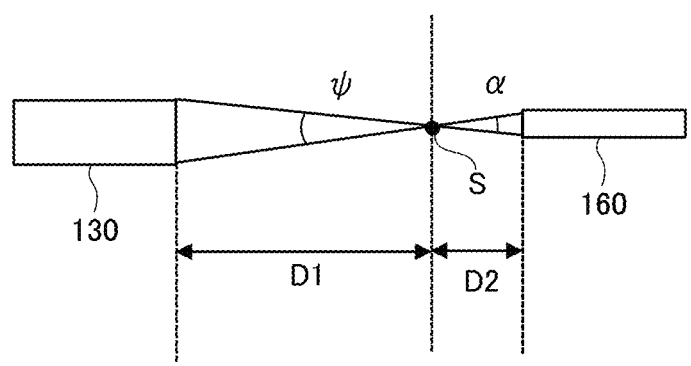
FIG. 3 is a schematic view showing a focusing angle and the aperture angle.

FIG. 3 is a schematic diagram showing a focusing angle and an aperture angle. The focusing angle Ψ is the maximum angle with respect to the optical axis of X-rays incident on the sample S from the condenser mirror. The aperture angle α is the maximum angle with respect to the optical axis of the X-ray incident on the reflecting mirror type X-ray lens unit 150 from the sample S and the numerical aperture NA is sin α. The focusing angle Ψ formed by the condenser mirror 130 and the numerical aperture NA to the reflecting mirror type X-ray lens unit 150 are determined according to each X-ray source. For example, for CuKα, the focusing angle ψ is 10 mrad, the aperture angle α is 4.7 mrad, and for MoKα, the focusing angle ψ is 5 mrad, and the aperture angle α is 2.7 mrad. Thus, the position of the sample S is determined, and the relationship between the distances D1 and D2 is determined. The intensity acquired on the high-resolution X-ray detector 190 as an X-ray microscope is approximately proportional to the square of the focusing angle and the aperture angle. Therefore, it is desirable to take these angles as large as possible for an apparatus in a laboratory where it is difficult to prepare an intense X-ray source, and the effect of increasing the incident angle on the reflecting surface by the multilayer film is extremely large.

[Multilayer Film]

Figure 4:
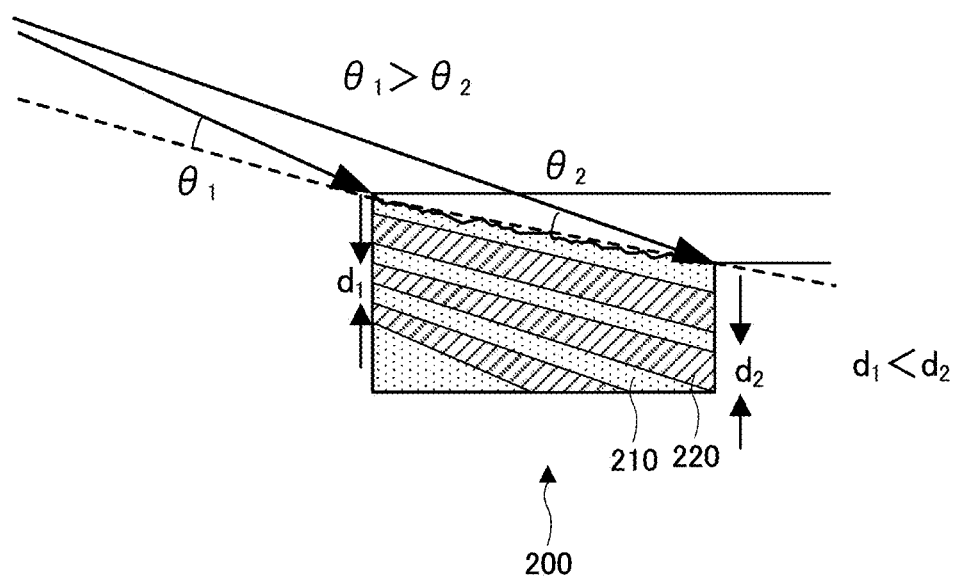
FIG. 4 is a cross-sectional view showing a multilayer film.

FIG. 4 is a cross-sectional view showing a multilayer film. As shown in FIG. 4, in the multilayer film, layers formed of a heavy element and layers formed of a light element are alternately stacked. In each multilayer film, a heavy element layer and a light element layer are repeatedly stacked as a pair of layers. The number of stacked layers may be set for each mirror constituting the mirror set.

The multilayer film selectively reflects characteristic X-rays of the corresponding wavelength out of the incident X-rays. The periodic formation of heavy and light elements produces regular graduations of the electron density, and a diffraction phenomenon occurs. If the incident X-rays contain continuous X-rays or a plurality of types of characteristic X-rays, the X-rays reflected from the multilayer mirror are a part or all of the characteristic X-rays diffracted by the multilayer film.

Multilayer spacing d is determined according to the wavelength of the characteristic X-rays and the shape of the mirror (the shape of the curved reflecting surface such as parabolic shape or elliptical shape). Therefore, the multilayer spacing is optimally designed according to the target type of the X-ray source 120 and the surface shape of the mirror.

In the example shown in FIG. 4, for the periodic length d1 at the position of the incident angle θ1 and the periodic length d2 at the position of the incident angle θ2, the relationship of d1<d2 is necessary when θ1>θ2. The thickness (period length) of each layer is designed to vary with position, and precise film formation as designed is required at the time of manufacturing.

By forming a multilayer film on the mirror surface, it becomes possible to increase the X-ray incident angle. As a result, it is possible to realize a compact focusing lens having a large focusing angle and a compact imaging lens having high numerical aperture.

The multilayer film can be formed by, for example, generating plasma and stacking particles generated by applying the plasma to a target on a substrate. At that time, it is possible to install a slit for squeezing the particles generated, by the opening shape, to adjust the number of particles reaching the substrate, that is, the film thickness. Alternatively, by changing the speed of the substrate passing through the vicinity of the slit, the layer thickness can be made thin where the substrate has moved faster and thick where the substrate has moved slowly. By combining these methods, it is possible to form thin films with different thicknesses from place to place with high accuracy. Note that tungsten or molybdenum as the heavy element, silicon, carbon, boron, or the like as the light element can be used.

The periodicity d of the multilayer film is preferably formed with an error of 0.5 Å or less with respect to the designed periodicity, and more preferably formed with an error of 0.2 Å or less. The nonuniformity of the shape and periodic structure of the optical element causes the disturbance in the wavefront of the X-ray. By forming a multilayer film so that the error of the periodicity on the position and the error of the surface shape are reduced with respect to the design value, it is possible to reduce the wavefront disturbance of the X-rays reflected by the formed reflecting surface. Thus, in imaging using hard X-rays, it is possible to acquire an X-ray image with sufficiently high resolution without phase shift over the entire surface of the lens.

For example, by adopting a reflection imaging lens coated with such a multilayer film, even when an 8 keV X-ray, which is generally used in a laboratory, is used, the aperture angle can be made larger than 4 mrad. Also, even when 17.5 keV X-rays are used, lenses, with which the aperture angle can be made larger than 3 mrad and the efficiencies exceed 40%, can be realized.

[Accuracy Test of Multilayer Film]

A multilayer film for each of imaging mirrors used in the imaging type X-ray microscope 100 was prepared. The multilayer film was produced by RIT (Rigaku Innovative Technologies, Inc.). As a film forming apparatus used for manufacturing a multilayer film, a film forming apparatus, in which high film forming stability, reproducibility, and film thickness controllability were achieved by repeating calibration many times, was used. The period lengths with respect to the position for each obtained multilayer film were measured with high accuracy by X-ray reflectivity.

Figure 5A:
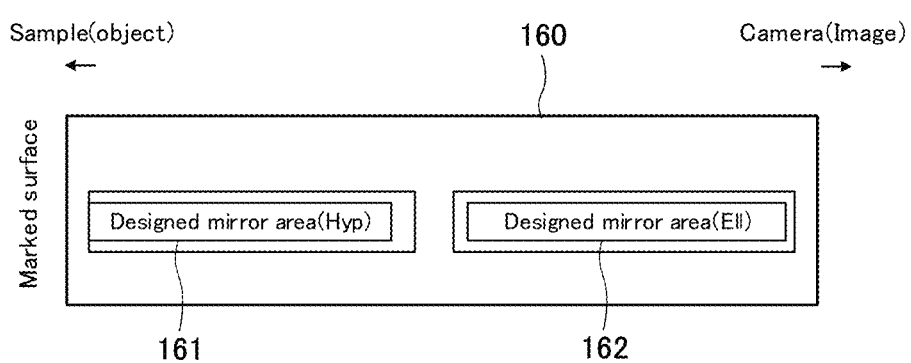
FIGS. 5A and 5B are plan views showing a mirror set of vertical reflections and a mirror set of horizontal reflections, respectively.
Figure 5B:
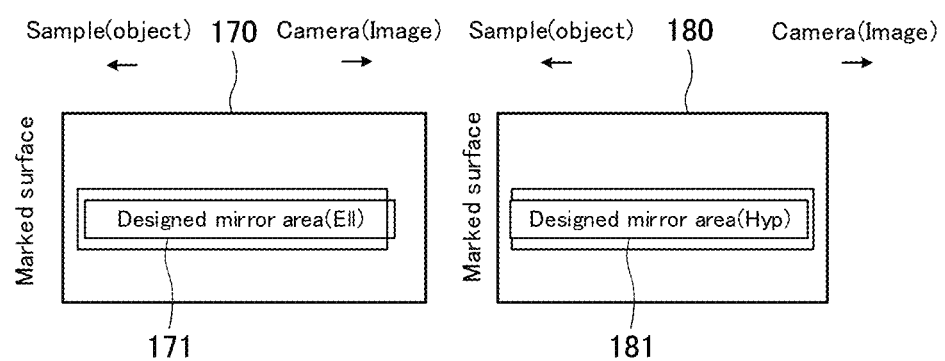

FIGS. 5A and 5B are plan views showing a mirror set of vertical reflections and a mirror set of horizontal reflections, respectively. As shown in FIG. 5A, each multilayer film of hyperbolic and elliptical surfaces was respectively formed in the first imaging mirror 161 and the second imaging mirror 162 of the imaging element 160 for vertical reflection. Further, as shown in FIG. 5B, each multilayer film of hyperbolic and elliptical surfaces was respectively formed in the first imaging mirror 171 and the second imaging mirror 181 of the imaging element 170 and the imaging element 180 for horizontal reflections.

Figure 6:
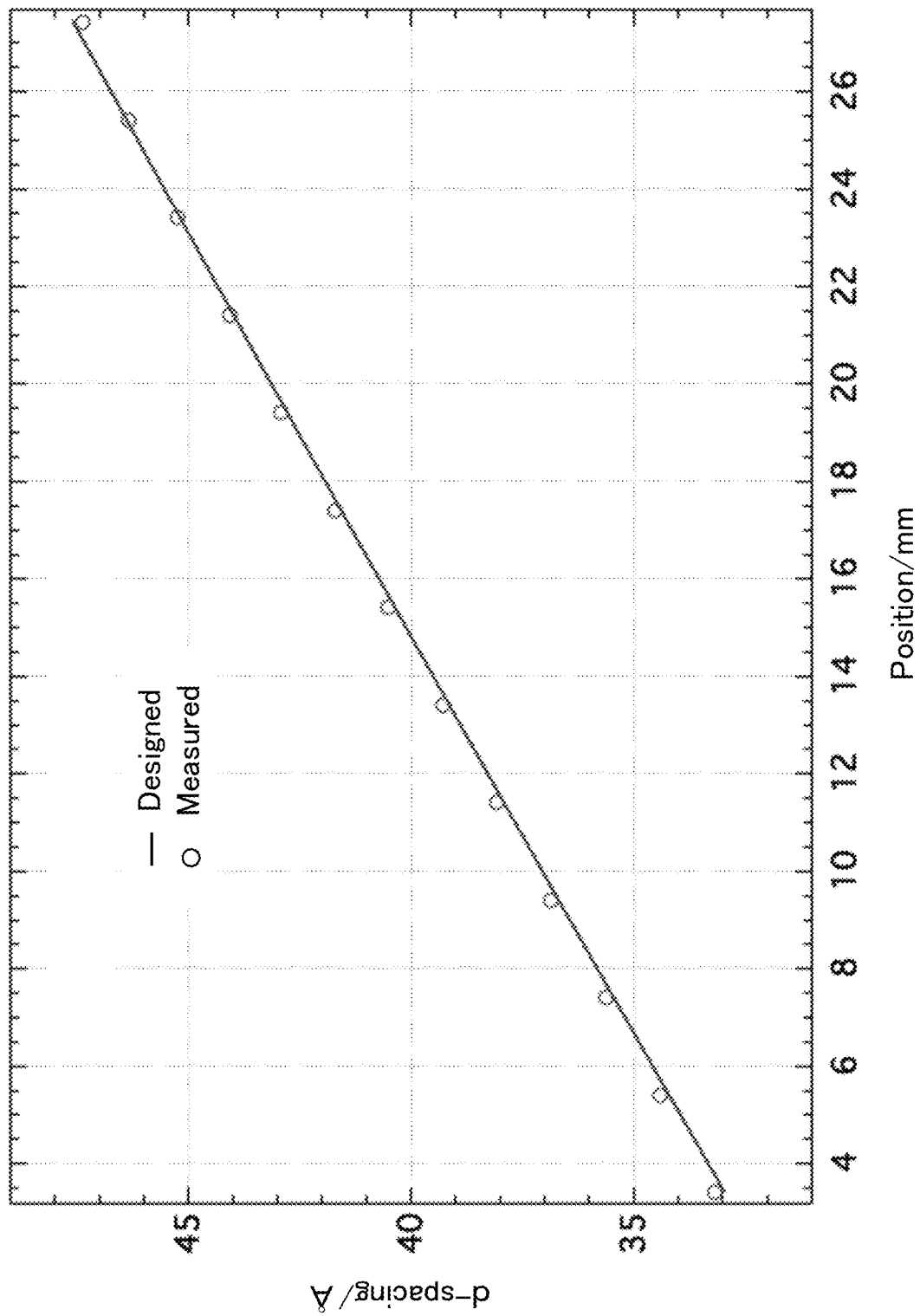
FIG. 6 is a graph showing the design value and the measured value of the period length of the multilayer film with respect to the position of the first imaging mirror for vertical reflection.
Figure 7:
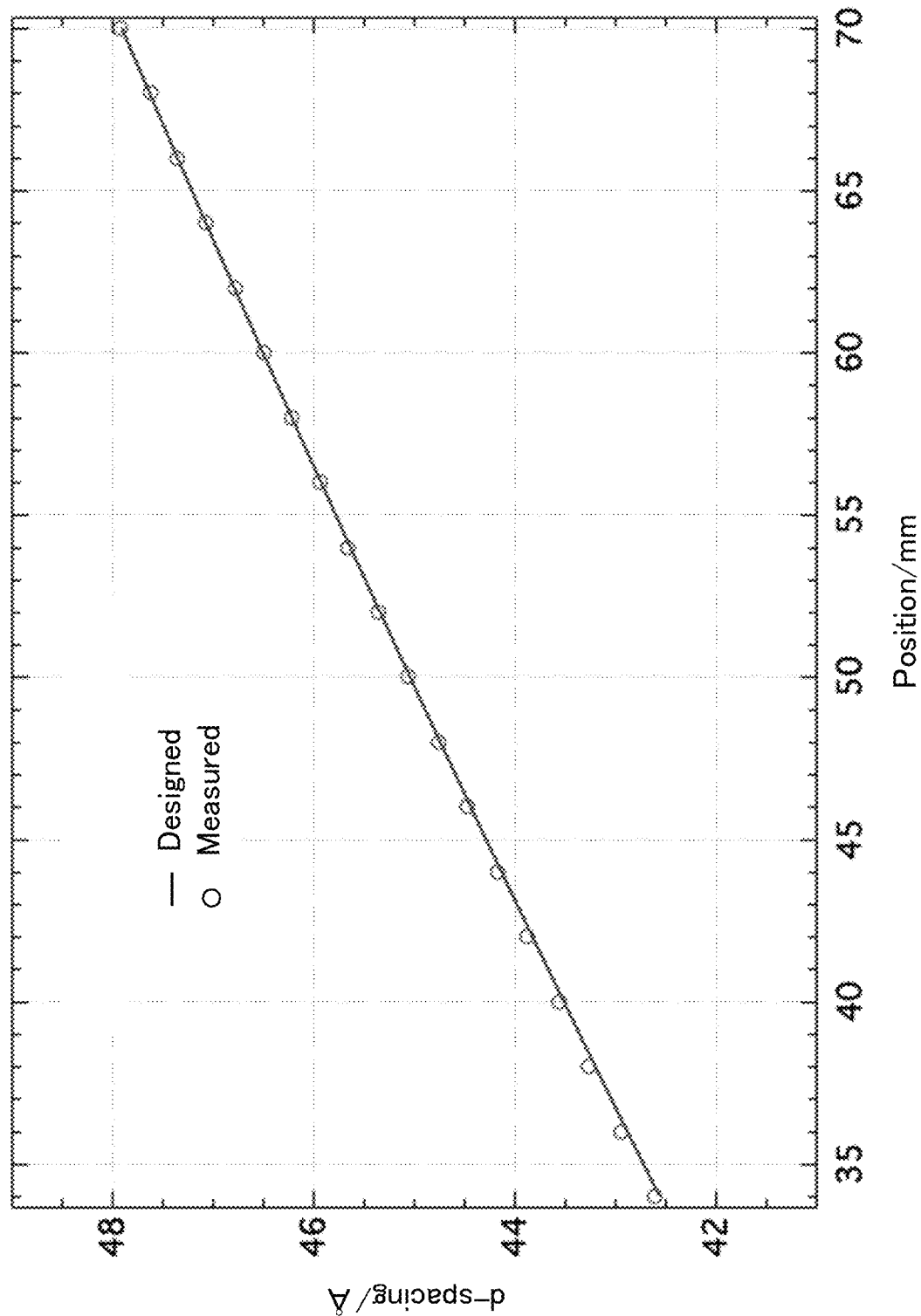
FIG. 7 is a graph showing the design value and the measured value of the period length of the multilayer film with respect to the position of the second imaging mirror for vertical reflection.
Figure 8:
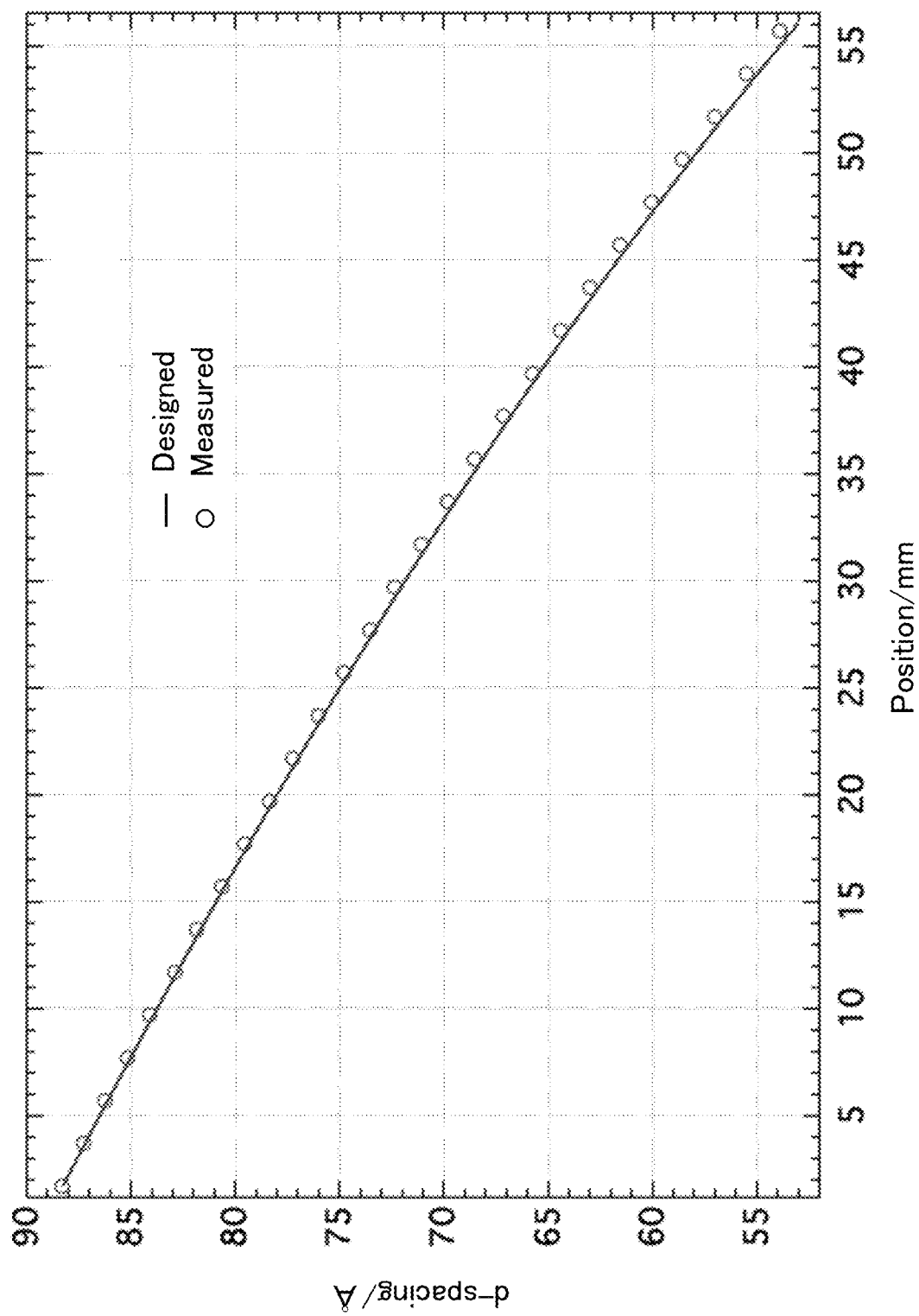
FIG. 8 is a graph showing the design value and the measured value of the period length of the multilayer film with respect to the position of the first imaging mirror for horizontal reflection.
Figure 9:
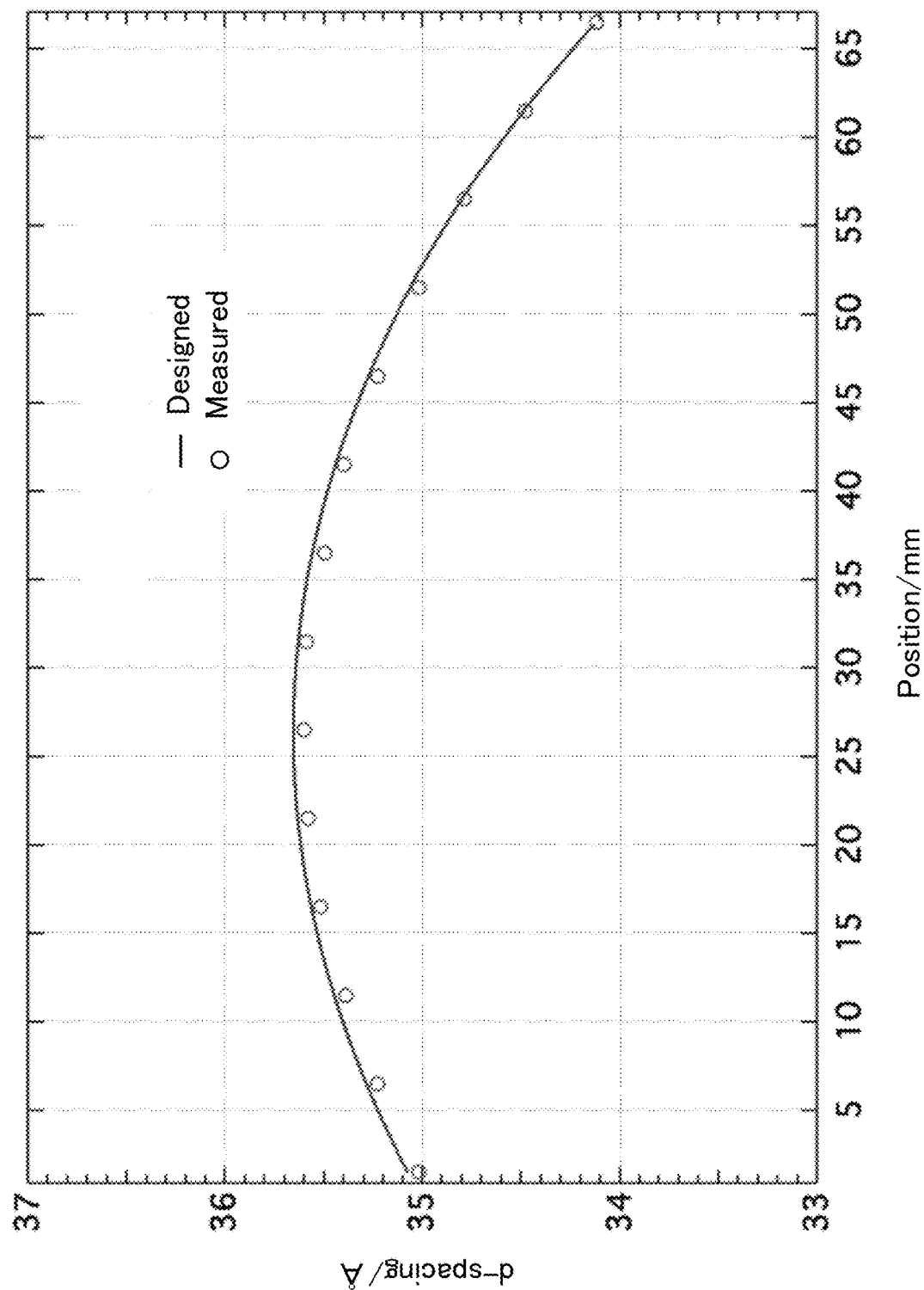
FIG. 9 is a graph showing the design value and the measured value of the period length of the multilayer film with respect to the position of the second imaging mirror for horizontal reflection.

FIG. 6 is a graph showing the design value and the measured value of the period length of the multilayer film with respect to the position of the first imaging mirror for vertical reflection. FIG. 7 is a graph showing the design value and the measured value of the period length of the multilayer film with respect to the position of the second imaging mirror for vertical reflection. FIG. 8 is a graph showing the design value and the measured value of the period length of the multilayer film with respect to the position of the first imaging mirror for horizontal reflection. FIG. 9 is a graph showing the design value and the measured value of the period length of the multilayer film with respect to the position of the second imaging mirror for horizontal reflection.

In either figure, the straight line represents the design value of the period length corresponding to the position, the circle represents the measured value of the period length for each position. With respect to the periodic length of the multilayer film in each of the imaging mirrors, the error was within 0.2 Å.

Figure 10:
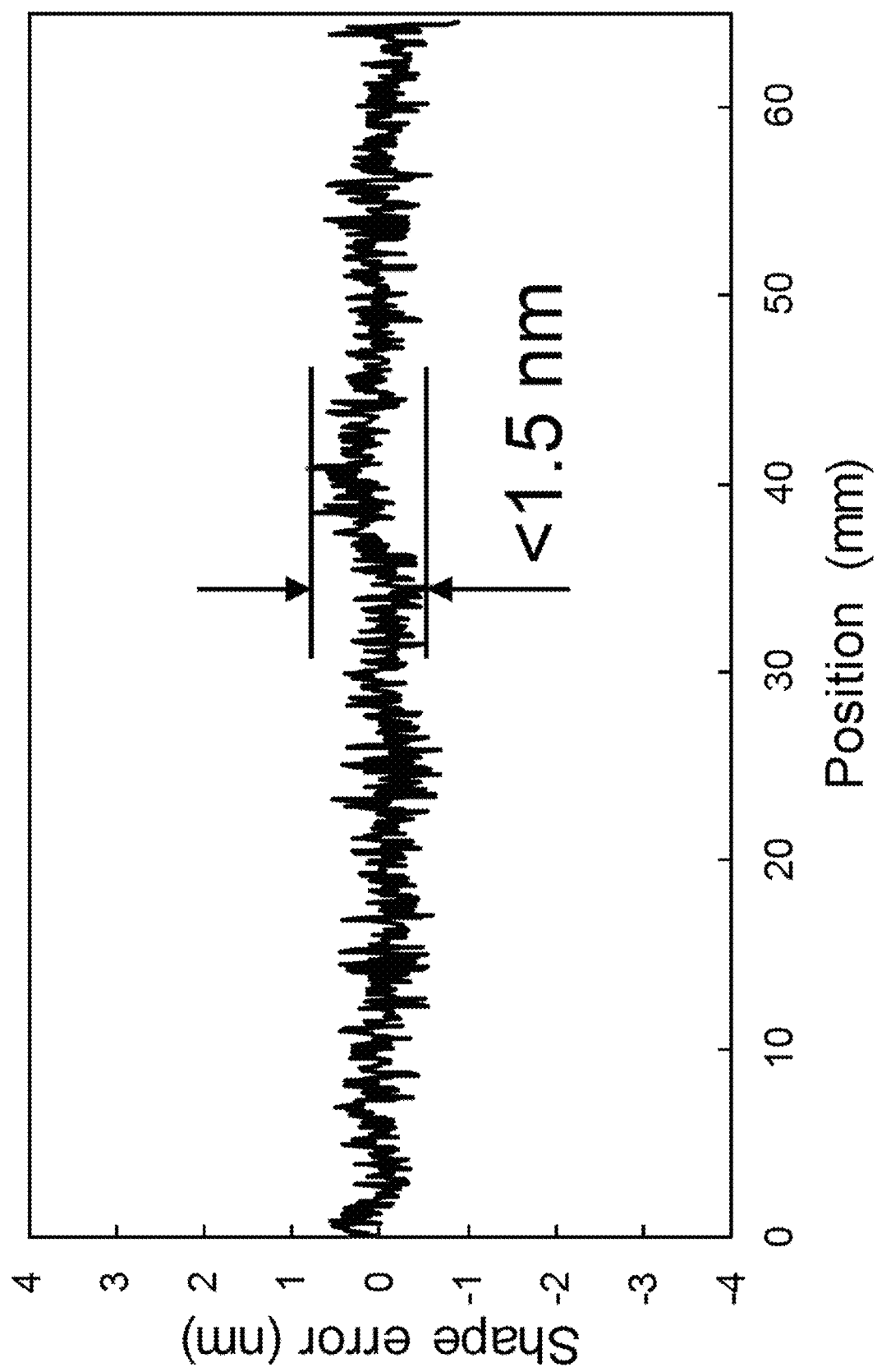
FIG. 10 is a graph showing the magnitude of the error for the surface shape with respect to the position of the second imaging mirror for horizontal reflection.

FIG. 10 is a graph showing the magnitude of the error of the surface shape with respect to the position of the second imaging mirror for horizontal reflection. As shown in FIG. 10, the error of the surface shape in the second imaging mirror for horizontal reflection was within 1.5 nm. Incidentally, the same results as the second imaging mirror for horizontal reflection was obtained for the surface shape of the other mirrors.

[Resolution Evaluation of X-Ray Image]

The imaging type X-ray microscope 100 was assembled using the mirror manufactured with the accuracy of the above multilayer film. An X-ray source of CuKα was used. Specifications of the details of the mirror set constituting the reflecting mirror type X-ray lens unit 150 is as shown in the following table.

| SHAPE | VERTICAL REFLECTION MIRROR SET | | HORIZONTAL REFLECTION MIRROR SET | |
|---|---|---|---|---|
| | HYPERBOLIC CONCAVE | ELLIPTICAL CONCAVE | ELLIPTICAL CONCAVE | HYPERBOLIC CONVEX |
| MIRROR LENGTH (mm) | 22.4 | 35.0 | 64.2 | 54.0 |
| DIAGONAL INCIDENT ANGLE (mrad) | 17.0 | 19.34 | 21.6 | 10.6 |
| NUMERICAL APERTURE | $4.74 \times 10^{-3}$ | | $4.83 \times 10^{-3}$ | |
| VIEWING FIELD (μm) | 13.5 | | 36 | |
| MAGNIFICATION RATIO | 32 | | 31 | |
| N NUMBER OF W/Si MULTILAYER FILM | 75 | 75 | 100 | 40 |
| REFLECTIVITY | 75~80% (PER REFLECTION) | | | |

For the high-resolution X-ray detector 190, a high-resolution X-ray camera Xsight XRM manufactured by Rigaku was used. As a sample, an X-ray image of a test chart for resolution evaluation was acquired. As a test chart for resolution assessment, X-ray charts of thick film high-resolution types made by NTT-AT (XRESO-50HC, smallest dimension of 50 nm, pattern height of 500 nm) were used. The pixel resolution of the calculated X-ray image was 23 nm. Incidentally, the relationship between the magnification of the reflecting mirror type X-ray lens unit 150, the spatial resolution of the high-resolution X-ray detector 190 and the pixel resolution of the X-ray image is as shown in the following table.

| MAGNIFICATION RATIO OF IMAGING SYSTEM (TIMES) | SPATIAL RESOLUTION OF DETECTING SYSTEM (μm/pixel) | PIXEL RESOLUTION (μm/pixel) |
|---|---|---|
| M | A | B = M/A |

Figure 11A:
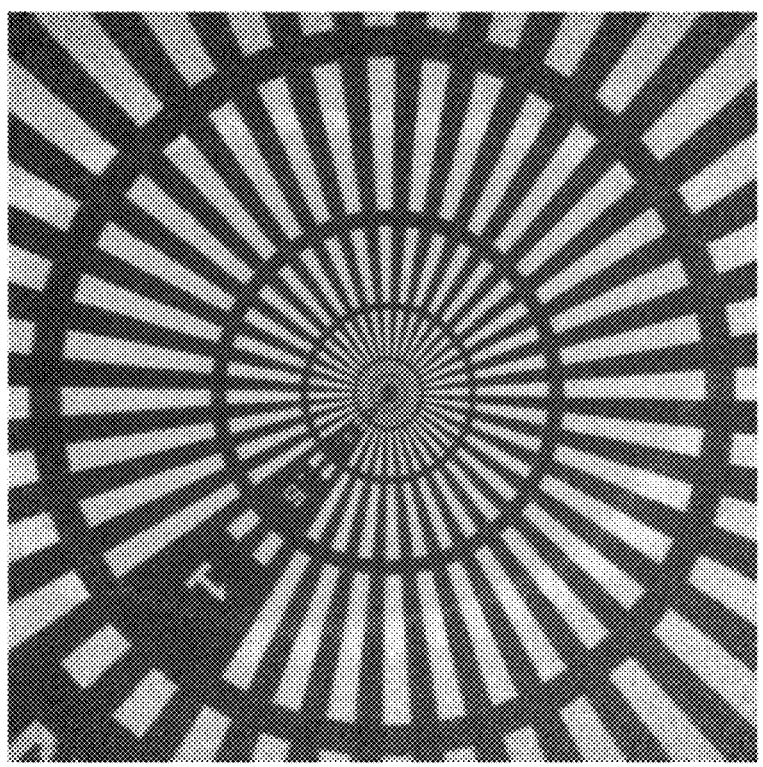
FIGS. 11A and 11B are diagrams showing X-ray images of test charts for resolution evaluations when exposure is performed for 30 seconds and 150 seconds, respectively.
Figure 11B:
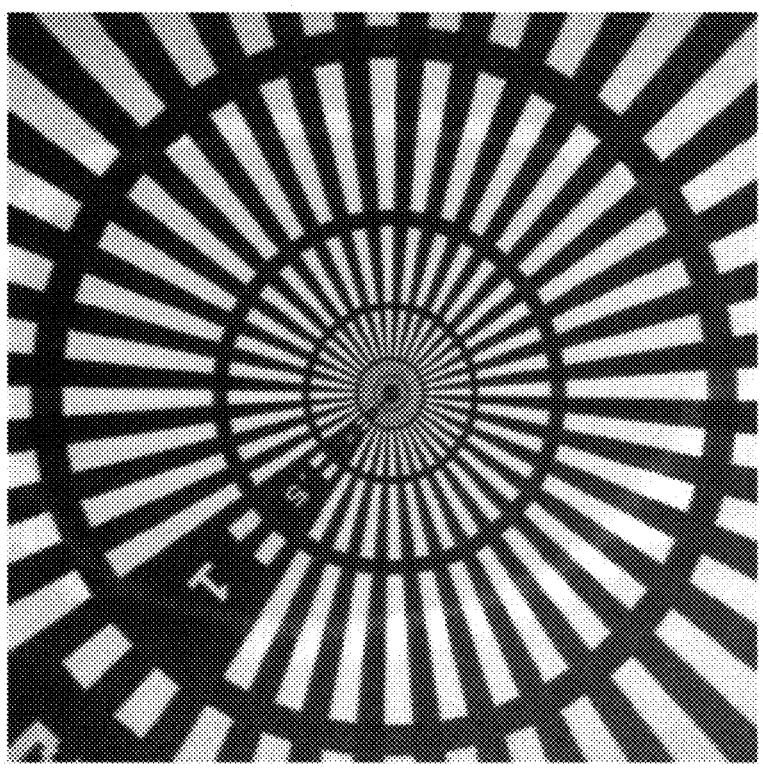

FIGS. 11A and 11B are diagrams showing X-ray images of test charts for resolution evaluations when each exposure was respectively performed for 30 seconds and 150 seconds. As shown in FIGS. 11A and 11B, in both X-ray images, 0.1 μm charts were distinguishable. However, the contrast clearly appeared in the exposure for 150 seconds than in the exposure for 30 seconds. As described above, even in the laboratory, measurement with a resolution of 100 nm or less becomes possible in several tens of seconds, and the imaging type X-ray microscope 100 has reached a practical product level as a laboratory device.

Figure 12:
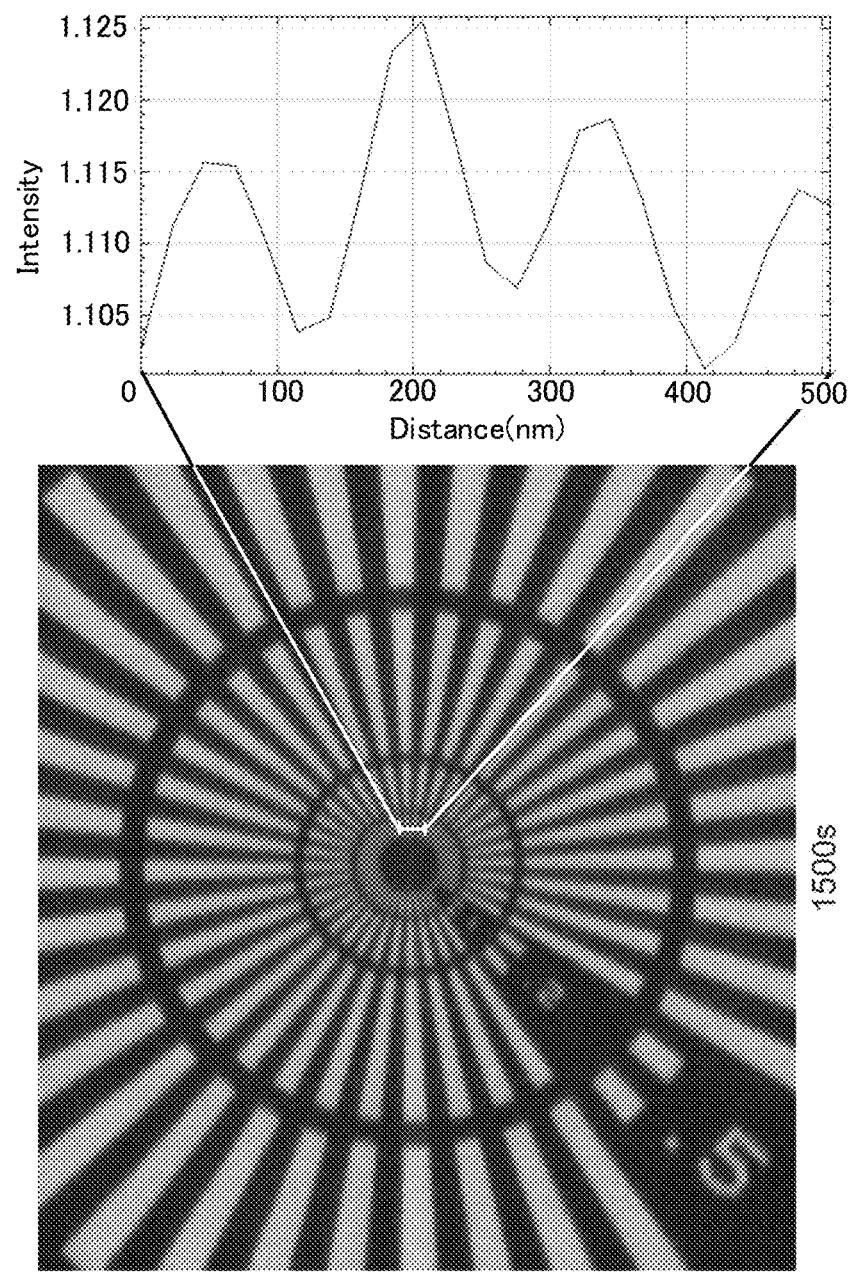
FIG. 12 is a graph showing an X-ray image and a portion of the intensity distribution of the test chart for resolution evaluation when exposed for 1500 seconds.

FIG. 12 is a graph showing an X-ray image and a portion of the intensity distribution of the test chart for resolution evaluation when exposed for 1500 seconds. As shown in FIG. 12, a part of the 50 nm chart pattern was distinguishable.

DESCRIPTION OF SYMBOLS 100 imaging type X-ray microscope
110 X-ray irradiation unit
120 X-ray source
130 condenser mirror
135 aperture
140 sample holding unit
150 reflecting mirror type X-ray lens unit
160-180 imaging element
190 high-resolution X-ray detector (imaging unit)
D1-D6 distance
L1、L2 distance
S sample
d1, d2 cycle length

What is claimed is:

1. An imaging type X-ray microscope comprising:
an X-ray irradiation unit having a microfocal and high-power X-ray source and a condenser mirror for focusing and irradiating the emitted X-rays toward a sample,
a sample holding unit for holding the sample,
a reflecting mirror type X-ray lens unit for imaging X-rays transmitted through the sample, and
an imaging unit for acquiring the imaged X-ray image, wherein
each mirror constituting the condenser mirror and the reflecting mirror type X-ray lens unit has a reflecting surface formed with a multilayer film having a high reflectivity in X-rays of a specific wavelength,
the reflecting mirror type X-ray lens unit is a Wolter type mirror set capable of reflecting in a first direction perpendicular to the X-ray irradiation direction and a second direction perpendicular to the first direction, and
the multilayer film is formed by alternately and periodically stacking layers formed of a heavy element and layers formed of a light element are alternately stacked and with an error of 0.5 Å or less with respect to the designed periodicity.

2. The imaging type X-ray microscope according to claim 1, wherein
the X-ray source generates X-rays with a focal spot size of 100 μm or less, and
the condenser mirror focuses the generated X-rays in an irradiation region of 100 μm or less.

3. The imaging type X-ray microscope according to claim 1, wherein the irradiated X-rays have an output of 500 W or more.

4. The imaging type X-ray microscope according to claim 1, wherein the irradiated X-rays have an energy of 4 keV or more.

5. The imaging type X-ray microscope according to claim 1, wherein the imaging unit has a spatial resolution of 1 μm or less.

* * * * *